United States Patent [19]

Towsend

[11] Patent Number: 4,842,175
[45] Date of Patent: Jun. 27, 1989

[54] STORAGE CONTAINER FOR A STATION WAGON

[75] Inventor: Marvin S. Towsend, Rockville, Md.

[73] Assignee: Genvention, Inc., Rockville, Md.

[21] Appl. No.: 94,834

[22] Filed: Sep. 10, 1987

[51] Int. Cl.[4] .............................................. B60R 11/00
[52] U.S. Cl. .................................. 224/275; 296/37.8;
    296/37.15; 296/37.16; 224/42.42; 224/901
[58] Field of Search ............... 280/769; 312/DIG. 33,
    312/278, 313; 297/340, 341, 344; 224/275,
    42.42, 901, 311, 273, 42.43, 42.45, 42.33;
    296/37.1, 37.6, 37.8, 37.15, 37.16

[56] References Cited

U.S. PATENT DOCUMENTS

| | | | |
|---|---|---|---|
| 413,017 | 10/1889 | Blydenburgh | 296/37.1 X |
| 1,404,484 | 1/1922 | Schoonmaker | 296/37.15 |
| 1,456,247 | 5/1923 | Miller | 224/42.42 |
| 1,609,403 | 12/1926 | Danek | 224/273 X |
| 1,941,375 | 12/1933 | Wildman | 224/42.43 |
| 3,132,781 | 5/1964 | Poczatek | 224/42.42 X |
| 3,394,849 | 7/1968 | Streeter | 224/42.42 R X |
| 3,403,830 | 10/1968 | Jones et al. | 224/273 |
| 3,800,939 | 4/1974 | Cornelius | 224/901 X |
| 3,912,139 | 10/1975 | Bowman | 224/42.45 R |
| 3,940,009 | 2/1976 | Szeles | 296/37.6 X |
| 4,088,365 | 5/1978 | Johnson | 296/37.6 |
| 4,143,800 | 3/1979 | McCaffrey | 224/42.42 |
| 4,179,153 | 12/1979 | Cole, Jr. | 296/37.1 |
| 4,215,896 | 8/1980 | Drouin | 224/42.42 X |
| 4,256,340 | 3/1981 | Dunchock | 296/37.15 X |
| 4,288,011 | 9/1981 | Grossman | 224/42.42 |
| 4,366,998 | 1/1983 | Kaiser | 312/DIG. 33 X |

*Primary Examiner*—Henry J. Recla
*Assistant Examiner*—Ernest G. Cusick
*Attorney, Agent, or Firm*—Marvin S. Towsend

[57] ABSTRACT

A storage container for storing articles in the interior of an automobile includes an outer storage element and an inner storage element which are telescopically adjustable with respect to one another. Nuts and bolts are provided for retaining the two adjustable storage elements in an adjusted position. A cover includes a hinge located toward the rear of the automobile, and the free end of the cover is located toward the front of the automobile thereby permitting placement and removal of items from the storage container from over the back seat inside the automobile. The two telescopically adjustable portions of the cover are connected together and lifted together by one handle. One of the adjustable cover portions is associated with the outer storage element, and one of the adjustable cover portions is associated with the inner storage element. End stabilizers, such as screw clamps, are located at the ends of the storage elements and stabilize the storage elements with respect to the vertical walls in the interior of the automobile. Bottom stabilizers, such as projections, are located at the bottom of the storage elements and stabilizers them with respect to the carpet located underneath the storage elements. The bottom projections frictionally engage the carpet tufts underneath the storage elements.

24 Claims, 2 Drawing Sheets

STORAGE CONTAINER FOR A STATION WAGON

FIELD OF THE INVENTION

The present invention relates to the field of containers for storing a variety of items in a motor vehicle. More particularly, the invention relates to a storage container for use in a station wagon or the like.

BACKGROUND OF THE INVENTION

Motor vehicles designed for carrying passengers usually have a separate area for carrying a variety of items including a spare tire, jack, jumper cables, spare cans of oil or brake fluid, a container of windshield washer solvent, etc.. Often the separate storage area is known as a trunk and is designed as an integral part of the vehicle.

However, some passenger vehicles do not have a trunk. Generally, vehicles known as station wagons or hatchbacks do not have a trunk. Such vehicles generally do have a separate space inside the vehicle for storing a spare tire and a jack. However, the separate storage area in such vehicles is generally relatively small and does not have enough space for storing other items mentioned above once the spare tire and jack are in the storage area.

Although station wagons and hatchbacks have plenty of storage space generally, a storage container having adequate space for storing miscellaneous items such as jumper cables, spare cans of motor oil or brake fluid or liquid coolant or transmission fluid, wheel chocks, spare parts, a container of windshield washer solvent, etc. is generally not provided inside the vehicle.

To maximize the available storage space in a separate storage container for a station wagon or hatchback and, at the same time, to minimize the amount of space subtracted from the general storage space inside the vehicle, it would be desirable to provide a separate storage container that fits on the vehicle floor behind the back passenger seat of the vehicle and that is oriented parallel to the back seat. However, simply placing a storage container on the floor behind the back seat of a vehicle would not be satisfactory. When an automobile rides along a road, it often encounters bumps in the road which jostle the automobile and would jostle a container in the automobile. Therefore, it would be desirable to provide a storage container that resists vertical displacement when bumps in the road are encountered by the vehicle.

Other forces that tend to move a separate storage container in an automobile are the forces experienced when the automobile accelerates, decelerates, and encounters curves in the road. When curves in the road are encountered, centrifugal force would tend to displace a separate storage container laterally within the automobile. It would be desirable to provide a separate storage container for a station wagon or hatchback that resists horizontal displacement due to linear acceleration, deceleration, and centrifugal forces.

Centrifugal force on a container and its contents may also tend to displace the container toward the rear of the automobile. In other words, the container may tend to slide toward the rear of the station wagon or hatchback when curves are encountered. This is so because an unequal distribution of weight inside the container will permit the development of torque to be exerted on the container under the influence of centrifugal force. When torque occurs, the container will tend to slide around a pivot point and in doing so will tend to slide toward the rear of the vehicle.

There are many station wagons and hatchbacks available in both the new and used car market. The interior dimensions of such vehicles show a wide range. More particularly, the width of the interior dimension behind the back seat of a station wagon or hatchback can be markedly different from one vehicle to another. It would be desirable, therefore, to provide a separate storage container for a station wagon or hatchback that can be adjusted to a variety of different interior vehicle dimensions.

Adjustable containers are known. More specifically, adjustable containers that have two telescopic parts are also known. By adjusting the relative relationship between the telescopic parts, the size of the adjustable container can be adapted to a variety of dimensions. For example, a telescopically adjustable window refrigerator is shown in U.S. Pat. No. 1,203,380. A telescopically adjustable mailbox is disclosed in U.S. Pat. No. 1,992,640.

More specifically with respect to motor vehicles, telescopically adjustable storage devices are known. For example, a telescopically adjustable luggage rack installed outside of the automobile is shown in U.S. Pat. No. 1,904,114. Another telescopically adjustable luggage rack for an automobile is disclosed in U.S. Pat. No. 1,817,107.

However, with respect to a telescopically adjustable separate storage container for the interior of a station wagon, the prior art is almost completely lacking. In U.S. Pat. No. 3,132,781, a collapsible container for a station wagon has telescoping parts that are adjustable along the lengthwise dimension of the automobile. The container rests essentially in the middle of the station wagon floor; and there is no provision for prohibiting vertical or displacement.

Another device is shown in the prior art for increasing the storage space inside a station wagon. Specifically, U.S. Pat. No. 2,767,896 discloses a removable shelf installed inside a station wagon. However, this device has no telescoping feature, and its size cannot be adjusted to the width of the inside of the automobile.

A telescopically adjustable container installed on the bed of a pickup truck just behind the cab of the truck is disclosed in U.S. Pat. No. 4,288,011. The container shown in this patent is telescopically adjustable along the width of the bed of the truck.

However, the storage container shown in U.S. Pat. No. 4,288,011 would not be suitable for use inside a station wagon or hatchback automobile for several reasons. First, there is no provision in U.S. Pat. No. 4,288,011 for preventing vertical displacement when bumps in the road are encountered. The horizontal portion 16' of end wall 16 forms a shoulder 48 which acts as an upper support for the container. When bumps are encountered in the road, no structure of the container prevents the container from being displaced vertically.

A second reason why U.S. Pat. No. 4,288,011 would not be suitable for use inside a station wagon or hatchback is that there is no provision for preventing the container from sliding horizontally toward the rear of the pickup truck bed under the influence of acceleration, deceleration, and centrifugal force and the torques exerted by the centrifugal force. Actually, the container in this patent appears to be particularly susceptible to sliding under the influence of horizontal forces. It is noted that the shoulder 48 is a smooth horizontal surface, and the top of the side wall of the pickup truck also appears to be a smooth horizontal surface. Two smooth horizontal surfaces in contact with one another are readily susceptible to a sliding motion therebetween.

Furthermore, with respect to U.S. Pat. No. 4,288,011, the hollow legs 24 have smooth bottom horizontal surfaces that are in contact with the horizontal bed of the pickup truck. The smooth bottom horizontal surface would tend to slide along the horizontal bed of the pickup truck under the influence of horizontal, acceleration, deceleration, and centrifugal forces.

Therefore, although U.S. Pat. No. 4,288,011 may be suitable for use as a storage container for the bed of a pickup truck, it would not be suitable as a storage container for use inside a station wagon or hatchback.

Another deficiency in the prior art storage containers for the interior of a station wagon or hatchback is the failure to design the storage container to provide additional passenger seating spaces for the vehicle. For example, often times little children enjoy riding in the rear area of a station wagon. Such children may like to sit on small seats if they were provided in the storage area. It would be desirable if the storage container could also serve as a seating area for small children.

SUMMARY OF THE INVENTION

Accordingly, it is an object of the present invention to provide a separate storage container for a station wagon or a hatchback that has adequate space for storing a variety of miscellaneous items.

Another object of the invention is to provide a separate storage container for a station wagon or hatchback that fits behind the back passenger seat of the vehicle and fits parallel to the back seat.

Another object of the invention is to provide a storage container for a station wagon or hatchback that resists vertical displacement when bumps in the road are encountered by the vehicle.

Still another object of the invention is to provide a separate storage container for a station wagon or hatchback that resists horizontal displacement due to centrifugal force.

Yet another object of the invention is to provide a separate storage container for a station wagon or hatchback that can be adjusted to a variety of different interior vehicle dimensions.

Another object of the invention is to provide a separate storage container for a station wagon or hatchback that prevents the container from sliding around a pivot point and sliding toward the rear of the vehicle under the influence of centrifugal force.

Another object of the invention is to provide a storage container for a station wagon that could also serve as an additional seating area for small children.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purpose of the present invention as described herein, an improved storage container for the interior of a station wagon or a hatchback includes: two horizontally telescopically adjustable storage elements, one inserted inside the other; means for retaining the two adjustable storage elements in an adjusted position; and a cover for the adjustable storage elements.

In accordance with another aspect of the invention, means are provided to stabilize a station wagon storage container to prevent it from moving vertically in the automobile due to forces from shocks transmitted from rough road surfaces or due to centrifugal forces. One type of stabilizing means may be provided for stabilizing the ends of the storage container with respect to vertical structures in the interior of the automobile adjacent to the respective ends of the storage container.

In accordance with another aspect of the invention, another type of stabilizing means, located on the bottom of the storage container, may be provided for stabilizing the storage container with respect to horizontal movement along the interior structure of the automobile located underneath and supporting the storage container.

Both the end stabilizing means and the bottom stabilizing means contribute to stability against vertical and horizontal movement of the storage container in the automobile.

The bottom stabilizing means may include an adhesive material for engaging the underneath supporting structure for stabilizing the storage container against horizontal movement along the underneath support surface. The adhesive material may be a pressure-sensitive adhesive such as a double-sided adhesive tape. The underneath stabilizing means may also include projections for frictionally engaging the underneath supporting structure which is most commonly a carpet material. The underneath projections engage the tufts of the carpet for stabilizing the container. The underneath stabilizing projections may include hook and loop tape known as VELCRO.

The automobile interior vertical structures are usually interior walls but may also be rounded interior surfaces of wheel wells. The vertical stabilizing means may include screw clamps for exerting clamping pressure on the interior walls or interior wheel well surfaces thereby stabilizing the storage container against both horizontal and vertical movement along the interior vertical surfaces.

The cover permits placement and removal of the articles stored in the storage container. The cover includes a hinge located toward the rear of the automobile, and the free end of the cover is preferably located toward the front of the automobile. This arrangement of the cover permits an article to be placed in or removed from the storage container by reaching over the back portion of the interior rear seat in the automobile from a position toward the front of the automobile, such as the seat portion of the interior rear seat.

The cover includes two portions adjustable with respect to one another. One of the adjustable cover portions is used to cover the outer storage element and the other of the adjustable cover portions is used to cover the inner storage element. The cover for the inner storage element can be attached to the inner storage element by a flexible hinge. Because a hinge for the outer cover and a hinge for the inner cover are not coaxial, when the outer cover rotates around the axis of the hinges supporting the outer cover, the inner cover moves in an arc around the inner top edge of the inner storage element. The flexible hinge for the inner cover must be able to accommodate the arc of motion of the inner cover. Because the two cover portions are connected together, one handle can be used for lifting and lowering both cover portions together.

Alternatively, the cover for the inner storage element can be independent of the inner storage element. That is, the inner cover can be attached to and fully supported by the outer cover. Slots are provided in the inner cover to permit it to be adjusted with respect to the outer cover. When the outer cover is lifted or lowered, then the attached inner cover is also lifted or lowered respectively.

In accordance with another aspect of the invention, a storage container is provided whose cover serves as an additional seating area for small children behind the rear seat in the station wagon.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

DETAILED DESCRIPTION OF THE PREFERRED EMBODIMENT

Figure 1:
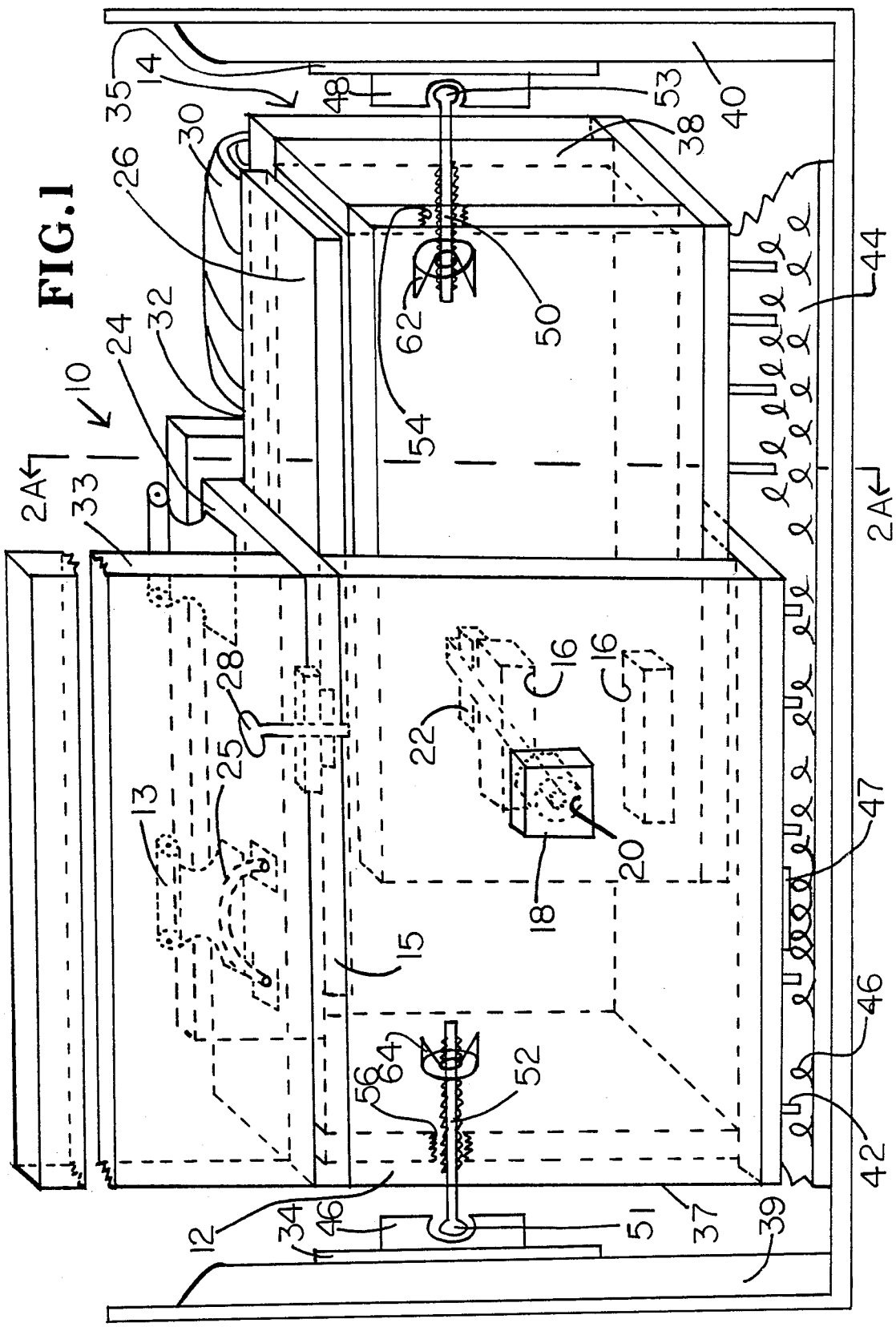
FIG. 1 is a side view of an embodiment of a telescopic storage container of the invention in place between two vertical walls and supported by an underneath supporting surface.

With reference to FIG. 1, there is disclosed a preferred embodiment of the storage container 10 of the present invention. The storage container 10 for the interior of a station wagon or a hatchback includes an outer horizontally telescopically adjustable storage element 12 and an inner telescopically adjustable storage element 14. Slots 16 are provided in at least one of the walls of the inner storage element 14. A bolt 18 extends through a hole 20 in the outer storage element 12, and a nut 22 is threaded onto bolt 18 and tightened to retain the two adjustable storage elements 12 and 14 in an adjusted position.

A first cover or outer cover 24 is attached to the outer storage element 12 by hinges 13. A second cover or inner cover 26 is attached to the first cover 24. The hinges 13 are located toward the rear of the automobile, and the free end 15 of the outer cover 24 is located toward the front of the automobile. This arrangement of hinge and cover permits an article to be placed in or removed from the storage container by reaching over the back automobile seat from a position toward the front of the automobile.

Figure 2A:
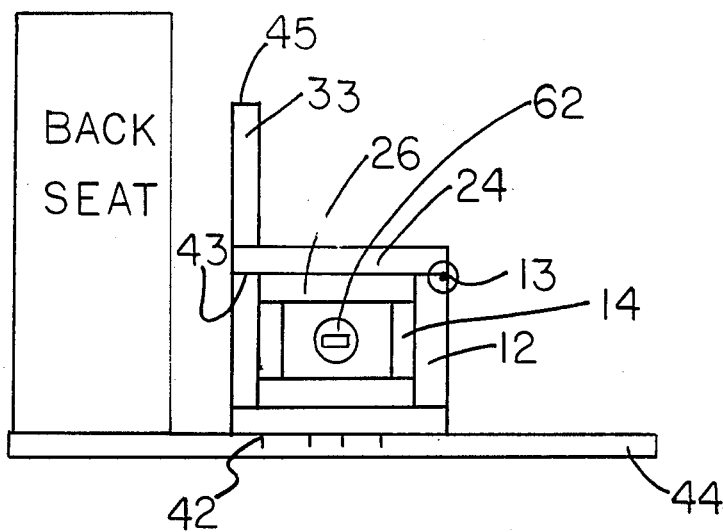
FIGS. 2A is a cross sectional view taken along the line 2A—2A in FIG. 1 showing the cover capable of serving as a seat.
Figure 2B:
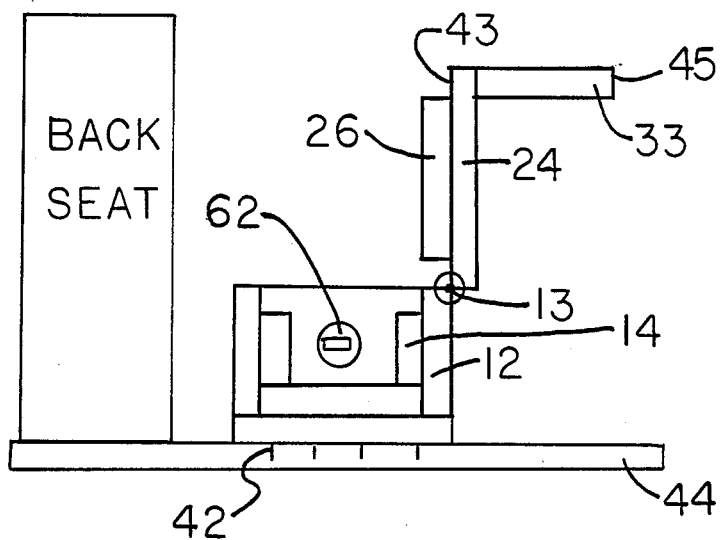
FIG. 2B shows the position of the seat back when the cover is opened 90 degrees.
Figure 2C:
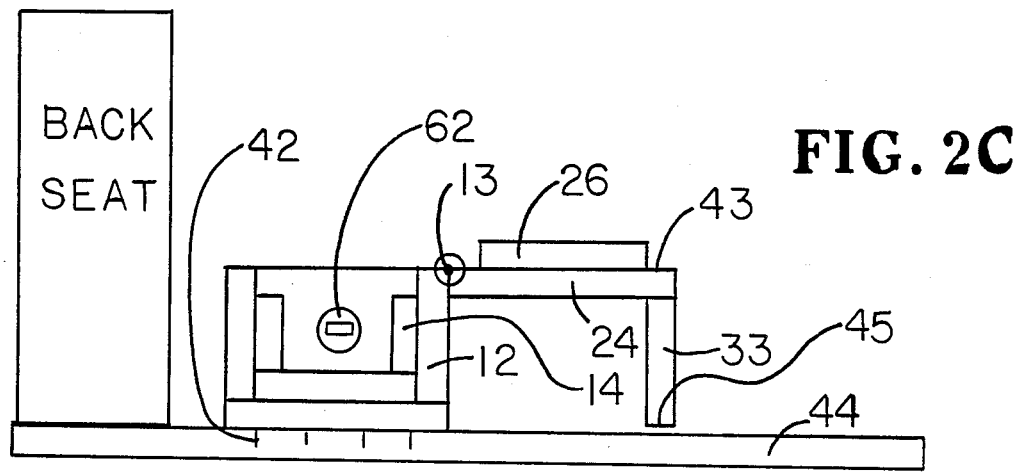
FIG. 2C shows the position of the seat back when the cover is opened 180 degrees.

The outer cover 24 may be designed to serve as a seat for small children. To increase the comfort of the seat, a seat back 33 is integrated into the outer cover 24. The position of the cover seat 24 and seat back 33 when the cover is closed are shown also in FIG. 2A. In FIG. 2B, the cover and seat back 33 have been rotated 90 degrees around hinges 13 to permit access to the interior of the storage container. In FIG. 2C, the cover and seat back 33 have been rotated around the hinges 13 another 90 degrees. In the position shown in FIG. 2C, the bottom side 43 of the cover 24 is facing upward. Furthermore, the top edge 45 of the seat back 33 is upside down and in contact with the floor 44. With the orientation of the seat back 33 and cover seat 24 shown in FIG. 2C, the bottom side 43 of the cover 24 can serve as a table.

Slots 27 in the inner cover 26 permits the inner cover to be adjusted with respect to the outer cover 24. Securing means such as nut and bolt 28 are used to secure the inner cover 26 to the outer cover 24. When the outer cover 24 is lifted or lowered, then the attached inner cover 26 is also lifted or lowered, respectively.

The outer adjustable cover portion 24 is used to cover the outer storage element 12, and the inner adjustable cover portion 26 is used to cover the inner storage element 14. The cover for the inner storage element can be attached to the inner storage element by a flexible hinge 30. Because hinges 13 for the outer cover 24 and the flexible hinge 30 for the inner cover 26 are not coaxial, when the outer cover 24 rotates around the axis of the hinges supporting the outer cover, the inner cover 26 moves in an arc around the inner top edge 32 of the inner storage element 14. The flexible hinge 30 for the inner cover 26 must be able to accommodate the arc of motion of the inner cover.

Alternatively, the cover 26 for the inner storage element 14 need not be hingedly connected to the inner storage element 14. That is, the inner cover 26 can be attached to and fully supported by the outer cover 24.

A single handle 25 located on the outer cover 24 is used to lift and lower both the outer cover 24 and the inner cover 26 at the same time. End stabilizing pads 34 and 35 are provided to stabilize the respective ends 37 and 38 of each of the storage elements 12 and 14 with respect to interior walls 39 and 40 of the automobile adjacent to the ends of the respective storage elements.

Bottom stabilizing projections 42, e.g. Velcro located on the bottoms of the respective storage elements, are provided to stabilize each of the storage elements with respect to movement along the interior structure of the automobile, namely the floor 44, located underneath and supporting each of the respective storage elements. Most commonly, the floor 44 of the automobile has a carpet, and the projections 42 can frictionally engage the tufts 46 of the carpet for added stability.

Both the end stabilizing pads 34 and 35 and the bottom stabilizing projections 42 contribute to the stability of the storage elements 12 and 14 against vertical and horizontal movement due to forces from road shocks or from centrifugal forces.

Instead of projections 42, the bottom stabilizing means may include an adhesive material for engaging the floor 44. The adhesive material may be a pressure-sensitive adhesive such as a double-sided adhesive tape 47.

The end stabilizing pads 34 and 35 can be supported by stabilizing plates 46 and 48 which have rotatable ball and socket connections 51 and 53 with threaded shafts 50 and 52, respectively. The threaded shafts 50 and 52 are threadingly engaged with complementary threaded holes 54 and 56, respectively in the end walls 58 and 60 of inner storage element 14 and outer storage element 12, respectively. Knurled knobs 62 and 64 are attached to shafts 50 and 52, respectively.

By turning the knurled knobs, the threaded shafts are turned, and the threaded shafts advance outward from the end walls 58 and 60 toward the interior walls 39 and 40. As the threaded shafts advance toward the interior walls 39 and 40, they exert clamping pressure on the interior walls 39 and 40 through the interposed stabilizing plates 46, 48 and pads 34, 35.

Numerous benefits are obtained by employing the principles of the invention. For example, by employing the principles of the invention a separate storage container for a station wagon or a hatchback is provided that has adequate space for storing a variety of miscellaneous items.

By following the teachings of the invention, a separate storage container for a station wagon or hatchback is provided that can be adjusted to a variety of different interior vehicle dimensions.

By employing the principles of the invention a separate storage container for a station wagon or hatchback is provided that fits behind the back passenger seat of the vehicle and fits parallel to the back seat.

In accordance with the invention, a storage container for a station wagon or hatchback is provided that resists vertical displacement when bumps in the road are encountered by the vehicle.

With the invention a separate storage container for a station wagon or hatchback is provided that resists horizontal displacement due to acceleration, deceleration, and centrifugal forces.

In accordance with the invention, a separate storage container for a station wagon or hatchback is provided that prevents the container from sliding around a pivot point and sliding toward the rear of the vehicle under the influence of centrifugal force.

By employing the principles of the invention, a station wagon storage container is provided by which the cover can serve as a seat for small children. Furthermore, when the cover is rotated 180 degrees from the closed position, the cover can serve as a table.

The foregoing description of the invention has been presented for purposes of illustration and description. It is not intended to be exhaustive or to limit the invention to the precise form disclosed. For example, although each end of a telescoping storage element has an end stabilizing means, only one end stabilizing device need be used.

Preferably, both end stabilizing means and bottom stabilizing means are used together to bring about maximum stability of the storage elements. However, a measure of stability is obtainable if only one or the other of end or bottom stabilizing means are used.

The cover can serve as a seat for small children whether or not a seat back is also provided.

The end stabilizing features, bottom stabilizing features, and cover seat features can all be used with a storage container that has a constant length that is not variably adjustable by telescoping elements.

Furthermore, obvious modifications or variations of the storage container of the invention are possible in light of the above teachings. The embodiments where chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A storage container for storing articles in the interior of a passenger compartment of an automobile having interior vertical surfaces, said container comprising:

a storage element including two ends, said ends exerting pressure on the interior vertical surfaces, a cover for said storage element, said cover permitting placement and removal of the articles stored in said storage element, and end stabilizing means for stabilizing the ends of said storage element against the vertical surfaces in the interior of the passenger compartment of the automobile.

2. The storage container described in claim 1, further comprising: a seat back connected to said cover.

3. A storage container for storing articles in the interior of a passenger compartment of an automobile having interior vertical surfaces adjacent a floor behind a passenger seat, said container comprising:

a storage element including two ends, said ends exerting pressure on the interior vertical surfaces in the passenger compartment, cover means for said storage element, said cover means permitting placement and removal of the articles stored in said storage element, and bottom stabilizing means for stabilizing said storage element with respect to the interior floor behind the passenger seat of the automobile located underneath and supporting said storage element, further comprising a seat back connected to said cover.

4. A storage container for storing articles in the interior of a passenger compartment of an automobile having interior vertical surfaces and a floor behind a passenger seat, said container comprising:

a storage element including two ends, said ends exerting pressure on the interior vertical surfaces in the passenger compartment, a cover for said storage element, said cover permitting placement and removal of the articles stored in said storage element, and end stabilizing means for stabilizing the ends of said storage element against the vertical surfaces in the interior of the automobile, bottom stabilizing means for stabilizing said storage element with respect to the interior floor behind the passenger seat of the automobile located underneath and supporting said respective storage element.

5. The storage container described in claim 4 further comprising: a seat back connected to said cover.

6. A storage container for storing articles in the interior of a passenger compartment of an automobile having vertical surfaces and having a floor behind a passenger seat, said container comprising:

an outer storage element and an inner storage element, said storage elements being telescopically adjustable with respect to one another each of said storage elements including a respective end exerting pressure on a respective vertical surface, means for retaining said two adjustable storage elements in an adjusted position, a cover for said adjustable storage elements, said cover including two telescopically adjustable portions in contact with one another, one of said adjustable cover portions associated with said outer storage element and one of said adjustable cover portions associated with said inner storage element, said cover permitting placement and removal of the articles stored in said storage elements, and end stabilizing means for stabilizing the ends of said storage elements against the vertical surfaces in the interior of the passenger compartment of the automobile.

7. The automobile storage container described in claim 6 wherein said end stabilizing means for the vertical surfaces stabilize against vertical and horizontal movement of said storage container within the interior of the automobile.

8. The automobile storage container described in claim 6 wherein said cover includes a hinge, said hinge located toward the rear of the automobile, and said cover including a free end located toward the front of the automobile.

9. The automobile storage container described in claim 6 further including means for connecting said two telescopically adjustable cover portions, said cover portions connecting means permitting lifting and lowering both said outer cover portion and said inner cover portion at the same time.

10. The automobile storage container described in claim 6 wherein:
said automobile interior vertical surfaces are interior walls, and
said end stabilizing means include means for exerting clamping pressure on the interior vertical walls of the automobile.

11. The automobile storage container described in claim 10 wherein said clamping means are screw clamps.

12. The storage container described in claim 6 wherein said outer storage element cover portion and said inner storage element cover portion are connected together.

13. The storage container described in claim 6 wherein said outer storage element cover portion carries said inner storage element cover portion.

14. The storage container described in claim 6 wherein said outer storage element cover portion is hingedly attached to said outer storage element and said inner storage element cover portion is hingedly attached to said inner storage element.

15. A storage container for storing articles in the interior of a passenger compartment of an automobile having vertical interior surfaces and having a floor behind a passenger seat, said container comprising:
an outer storage element and an inner storage element, said storage elements being telescopically adjustable with respect to one another,
means for retaining said two adjustable storage elements in an adjusted position,
a cover for at least one of said adjustable storage elements, said cover permitting placement and removal of the articles stored in said storage elements from the passenger compartment,
end stabilizing means for stabilizing the ends of said storage elements by exerting pressure against the vertical surfaces in the interior of the passenger compartment of the automobile,
bottom stabilizing means for stabilizing each of said storage elements with respect to the interior floor behind the passenger seat of the automobile located underneath and supporting each of said respective storage elements.

16. The storage container described in claim 15, further comprising: a seat back connected to said cover.

17. The automobile storage container described in claim 15 wherein said bottom stabilizing means for the underneath floor stabilize against horizontal movement of said storage container within the interior of the automobile.

18. The automobile storage container described in claim 15 wherein said bottom stabilizing means includes an adhesive material.

19. The automobile storage container described in claim 18 wherein said adhesive material is a pressure-sensitive adhesive.

20. The automobile storage container described in claim 15 wherein said pressure-sensitive adhesive is in the form of a double-sided adhesive tape.

21. The automobile storage container described in claim 15 wherein said bottom stabilizing means includes projections for engaging the underneath supporting floor in the automobile interior.

22. The automobile storage container described in claim 15, wherein:
the underneath support floor in the automobile interior includes a carpet, and
said bottom stabilizing means includes projections which frictionally engage the tufts of the carpet.

23. The automobile storage container described in claim 15 wherein said bottom stabilizing projections include hook and loop material.

24. A storage container for storing articles in the interior a passenger compartment of of an automobile having interior vertical surfaces and having a floor behind a passenger seat, said container comprising:
an outer storage element and an inner storage element, said storage elements being telescopically adjustable with respect to one another,
means for retaining said two adjustable storage elements in an adjusted position,
a cover for at least one of said adjustable storage elements, said cover permitting placement and removal of the articles stored in said storage elements, said cover including a hinge, said hinge located toward the rear of the automobile, and said cover including a free end located toward the front of the automobile, said cover including two telescopically adjustable portions, one of said adjustable cover portions associated with said outer storage element and one of said adjustable cover portions associated with said inner storage element,
end stabilizing means for stabilizing the ends of said storage elements against the vertical surfaces in the interior of the passenger compartment of the automobile, said end stabilizing means includes means for exerting pressure on the vertical surfaces in the interior of the automobile,
bottom stabilizing means for stabilizing each of said storage elements with respect to the interior floor structure of the automobile located underneath and supporting each of said respective storage elements, said bottom stabilizing means including projections which frictionally engage the interior floor of the automobile located underneath said storage elements.

* * * * *